June 4, 1957 G. V. MORRIS 2,794,851

CODE STORAGE DEVICE

Filed Feb. 8, 1952 2 Sheets-Sheet 1

INVENTOR:
GEORGE V. MORRIS
BY Francis W. Crotty
HIS ATTORNEY.

June 4, 1957 G. V. MORRIS 2,794,851
CODE STORAGE DEVICE
Filed Feb. 8, 1952 2 Sheets-Sheet 2

INVENTOR:
GEORGE V. MORRIS
BY Francis W. Crotty
HIS ATTORNEY.

2,794,851

CODE STORAGE DEVICE

George V. Morris, Chicago, Ill., assignor to Zenith Radio Corporation, a corporation of Illinois Application February 8, 1952, Serial No. 270,557

1 Claim. (Cl. 178—22)

Figure 1:
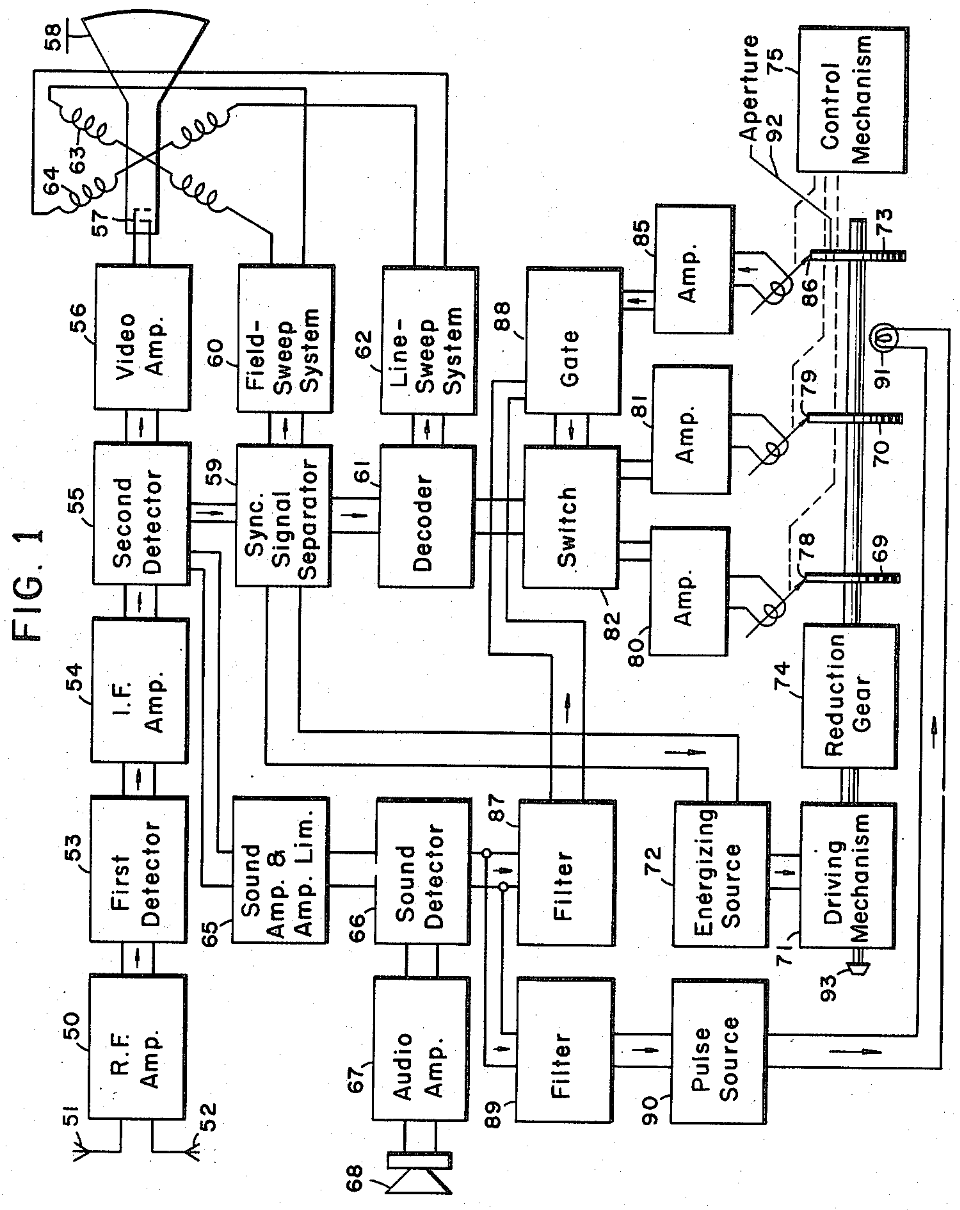

This invention relates to subscription television systems and more particularly to improved apparatus for controlling the encoding devices used in such a system to code or decode the subscription television signal. Since the invention may be practiced in either a transmitter or receiver, the term "encoding" is used herein in its generic sense to encompass either coding at the transmitter or decoding at the receiver.

Copending application Serial No. 270,173, filed February 6, 1952, in the name of Alexander Ellett, entitled "Subscription Television System," and assigned to the present assignee, discloses a subscription television system in which a plurality of individual control signals are used at the transmitter to control a coding device and effect coding of the television signal. These signals are derived from a corresponding plurality of code records each having coding information stored therein representing a selected code pattern; similar records are provided at each subscriber receiver having code information stored therein corresponding to the code information stored at the transmitter so that a corresponding plurality of control signals may be produced identical to those at the transmitter and used for decoding purposes.

To increase the coding complexity, as described in the Ellett application, the various code records may be controlled to change the phase of the control signals at the transmitter from time to time, for example, at the end of each program. This produces a change in the coding schedule of the subscription television signal and for subscriber receivers to continue to utilize the service, information concerning new settings for the code records at such receivers must be disseminated. This information can be obtained from a distribution center, the subscriber being charged for the service on the basis of each call placed.

The present invention provides apparatus particularly suited for use in subscription television systems of the type disclosed in the aforementioned Ellett application, that is, in a system in which a plurality of control signals are used to establish a coding schedule and in which it is desired to alter the coding schedule from time to time by altering the phase relation of the control signals.

It is, accordingly, an object of this invention to provide improved apparatus for use in a subscription television system for controlling encoding devices used in such a system for coding or decoding the subscription television signal.

A further object of the invention is to provide such improved apparatus for producing a plurality of individual control signals for use in a subscription television system for establishing a coding schedule therein, the apparatus being adjustable so that the phase relation of the control signals and, therefore, the coding schedule of the system may be altered from time to time.

The improved apparatus of this invention, as previously mentioned, supplies a plurality of individual control signals to an encoding device in a subscription television system. The apparatus comprises a series of spaced, co-axially-aligned, code-record members individually having coding information recorded thereon representing a selected code pattern. Driving means is mechanically coupled to the record members for rotating the members at a selected speed. A corresponding series of spaced, positioning members are aligned coaxially with the code-record members. These positioning members individually have peripheral teeth. A plurality of scanning devices are respectively supported by the positioning members and extend into scanning relation with corresponding ones of the code-record members to derive the aforesaid plurality of individual control signals. The apparatus has a series of pinions and a corresponding series of actuating arms respectively coupled to the pinions for selectively actuating the pinions into meshing engagement with the teeth of selective ones of the positioning members. Finally, a manual setting mechanism is provided for rotating the pinions to adjust the relative angular position of the positioning members and control the phase relation of the control signals.

Figure 2:
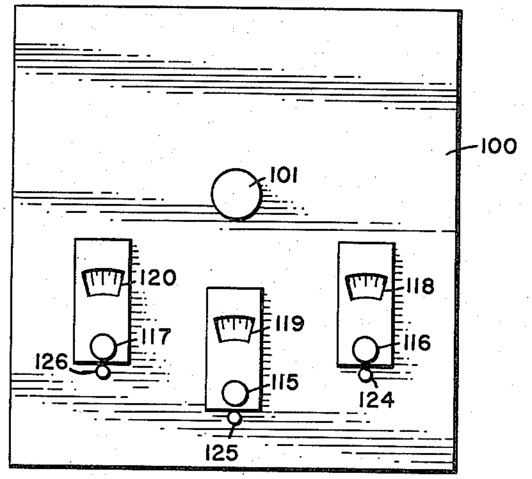
Figure 3:
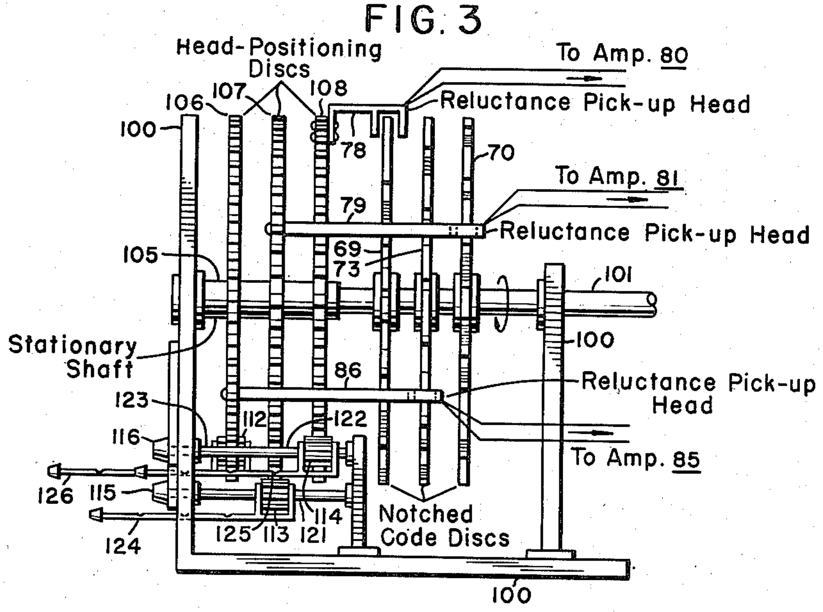

The features of this invention which are believed to be new are set forth with particularity in the appended claim. The invention itself, however, together with further objects and advantages thereof may best be understood by reference to the following description when taken in conjunction with the accompanying drawings, in which:

Figure 1 represents a television receiver similar to that disclosed and claimed in aforementioned copending application Serial No. 270,173, and in which the improved apparatus of the present invention may be incorporated, and, Figures 2 and 3 are two views of a preferred embodiment of the invention.

The receiver of Figure 1 comprises a radio-frequency amplifier 50 of any desired number of stages having input terminals connected to an antenna circuit 51, 52 and output terminals connected to a first detector 53. The first detector is coupled to an intermediate-frequency amplifier 54 of one or more stages which, in turn, is coupled to a second detector 55. The second detector is connected through a video amplifier 56 to the input electrodes 57 of a cathode-ray image-reproducing device 58. Second detector 55 is also connected to a synchronizing signal separator 59 which, in turn, is coupled to a field-sweep system 60 and through a decoder 61 to a line-sweep system 62. The output terminals of sweep systems 60 and 62 are connected respectively to the field-deflection elements 63 and the line-deflection elements 64 associated with device 58. Second detector 55 is also coupled to a sound amplifier and amplitude limiter 65 which is coupled through a sound detector 66 to an audio amplifier 67 and to a sound-reproducing device 68.

The receiver further comprises a pair of co-axially aligned code-record members 69 and 70 having code information recorded thereon representing in each instance, a selected code pattern. For example, members 69 and 70 may be discs of magnetic material with the code information taking the form of pulses of irregular spacing and width magnetically recorded about their peripheries in well-known fashion. The members are rotated by a drive mechanism 71 energized from a suitable source 72, the latter being coupled to signal separator 59 for synchronizing purposes. A further member 73 is also co-axially aligned with members 69 and 70 for concurrent rotation therewith, and member 73 also has code information recorded thereon in like manner. A reduction gear 74 having a selected reduction ratio is placed between driving mechanism 71 and the discs so that field-synchronizing pulses from separator 59 may be used to synchronize source 72 and yet the discs may be rotated at some sub-multiple of the field frequency of the system so that the coding schedules of the signals derived therefrom may embrace a multiplicity of fields. Discs 69, 70 and 73 form a portion of the apparatus of this invention and the relative position of the discs and their associated scanning devices may be adjusted, in a manner to be described, by a setting mechanism 75 which also forms a portion of the apparatus. The pick-up heads or scanning devices associated with discs 69 and 70 are designated 78 and 79 and are connected to amplifiers 80 and 81. The output terminals of the amplifiers are connected to an electronic switch or selecting device 82 which, in turn, is connected to decoder 61. A filter circuit 87 is connected to sound detector 66 to select a key signal distributed to the receiver as a modulation of the sound carrier, and the output terminals of this filter are connected to a gate circuit 88. Disc 73, likewise, has a pick-up head, or scanning device, 86 associated therewith and connected to gate circuit 88 through an amplifier 85.

Before considering the operation of the described receiver, it is expedient to discuss the nature of the signal transmitted thereto in practicing subscription television. Usually, the transmitter of the system will be equipped with a coder (the counterpart of unit 61 of the receiver) and a code storage apparatus (corresponding to components 69—88 of the receiver). The selector disc of this apparatus controls a selector mechanism so that it applies in alternation, and in accordance with a selecting schedule recorded on the selector disc, coding information obtained from scanning a pair of coding discs. The coding information is employed in actuating the coder between two operating conditions in one of which the timing of the video and line-synchronizing components of the radiated signal is conventional to provide what may be considered the normal operating mode of the transmitter. In the other of its operating conditions, the coder causes the time relation of the video and line-synchronizing components to be unconventional or abnormal to provide what may be considered the second operating mode of the transmitter. These variations in mode of operation effectively code the telecast, rendering its reproduction unintelligible in uncompensated receivers. For additional complexity, the function of the selector mechanism may be interrupted from time to time and the interval of each such interruption may be identified by a burst of key signal, enduring throughout that interval and disseminated to subscriber receivers as a modulation component of the sound carrier which customarily accompanies the picture carrier in commercial telecasting.

When the receiver is tuned to utilize such a subscription telecast, the radiated signal is intercepted by antenna 51, 52 and amplified in radio-frequency amplifier 50. The amplified signal is heterodyned to the selected intermediate frequency of the receiver in first detector 53, and the resulting intermediate-frequency signal is amplified in intermediate-frequency amplifier 54 and detected in second detector 55. The composite video signal from the second detector is amplified in video amplifier 56 and is then applied to the input electrodes 57 of reproducing device 58 to control the intensity of the cathode-ray beam thereof in accordance with the image intelligence.

The synchronizing components of the incoming television signal are separated out in separator 59, which applies field-synchronizing pulses to field-sweep system 60 and line-synchronizing pulses through decoder 61 to line-sweep system 62. In this manner, the sweep systems and, therefore, the line and field scansions of reproducing device 58 are synchronized with the incoming signal. Decoder 61 is actuated, in a manner to be described, to adjust the timing of the line-synchronizing pulses applied to line-sweep system 62 to compensate the aforementioned variations in timing between the video and line-synchronizing components of the television signal. It is necessary that this timing be corrected or compensated to enable device 58 to reproduce properly the picture intelligence.

In accordance with intercarrier-sound principles, detector 55 develops an intercarrier signal conveying the sound information, which is selected by means of an appropriate selecting network and applied to unit 65 wherein it is amplified and amplitude limited. The signal is then detected in circuit 66, amplified in audio amplifier 67 and the sound intelligence is reproduced in device 68. The aforementioned bursts of key signal, representing the interruptions of the selecting schedule, also appear as modulation components of the intercarrier signal and are selected by filter 87.

The code information recorded on code discs 69 and 70 is identical to that of the pair of code discs used at the transmitter in coding the subscription television signal. Moreover, the pattern of selector disc 73 is identical with the selecting schedule employed at the transmitter. The receiver discs are driven in synchronism with the corresponding discs of the transmitter by driving mechanism 71 due to the synchronization of energizing source 72 by field-synchronizing pulses derived from separator 59. As these discs rotate, pick-up heads 78 and 79 produce decoding signals identical to the coding signals utilized at the transmitter. After amplification in amplifiers 80 and 81, these decoding signals are applied to selector switch 82. At the same time pick-up head 86 produces a selecting signal identical to the selecting schedule of the transmitter coding system and this signal is amplified in amplifier 85 and applied to switch 82 through gate circuit 88. Moreover, the bursts of key signal selected by filter 87 and applied to gate circuit 88 open the gate to periodically interrupt the application of the selecting signal to switch 82 in correspondence with the interruptions in the transmitter of the selecting schedule.

During intervals when the selecting signal from disc 73 is applied to switch 82, it actuates the switch to permit the decoding signal from amplifier 80 and the decoding signal from amplifier 81 to be applied to decoder 61 in alternation and this actuation of the switch is interrupted at spaced intervals due to the action of gate circuit 88. All these operations are synchronized to occur in time coincidence with corresponding operations of the coding mechanism at the transmitter and, therefore, the timing of the line-synchronizing pulses applied to line-sweep system 22 is varied by an appropriate amount and at the proper intervals by decoder 61 to compensate the aforedescribed timing variations in the television signal.

The relative phase of the signals from discs 69, 70 and 73 may be established in a manner to be described so as to be identical to the phase relation of corresponding signals at the transmitter. So that the discs may be collectively phased with respect to the incoming television signal, the following arrangement may be used: a further filter 89, selective to an iso-synchronizing signal to be described presently, is coupled to sound detector 66 and has output terminals connected to a pulse source 90. This source is connected to and energizes a neon lamp 91 mounted to one side of selector disc 73 which is provided with a narrow, radial slot or aperture 92 permitting an observer to view the lamp from the obverse side of the disc. Driving mechanism 71 may comprise a motor having a manually rotatable stator, adjustable by turning a control knob 93 for phasing.

In considering the operation of the phasing arrangement, it will be assumed that the subscription signal, described above, includes an iso-synchronizing signal as a modulation component of the sound carrier. This signal may be originated in any of a variety of ways at the transmitter; for example, the selector disc of the coding mechanism may have an aperture similar to aperture 92 of disc 73 to effect modulation of a signal source once during each revolution of the disc. The operating frequency of this source is chosen to facilitate selection of the iso-synchronizing signal by filter 89. The signal selected by filter 89 is applied to source 90 which may be a multivibrator or other well-known pulse generator for developing in response thereto a pulse corresponding to the iso-synchronizing signal of the transmitter. This pulse energizes lamp 91 once during each rotation of disc 73 and its illumination is visible if the slot 92 of the disc is aligned with the lamp when it is energized. The phasing control 93 enables the subscriber to achieve this operating condition which indicates appropriate phasing of the disc family at the receiver relative to the discs of the transmitter. If the energizing interval of lamp 91 is short and slot 92 is narrow, accurate phasing is easily obtainable.

The various units of the receiver, with the exception of decoder 61, and the particular arrangement of discs 69, 70 and 73 and control mechanism 75 to be described, are in themselves extremely well known to the art, and a detailed explanation of the circuitry thereof is believed to be unnecessary. Decoder 61 may be similar in construction to that described in detail in Patent 2,547,598, issued April 3, 1951, in the name of Erwin M. Roschke, entitled "Subscription, Image Transmission System and Apparatus," and assigned to the present assignee. The arrangement of the code discs and control mechanism 75 forms the subject matter of the present invention, and one embodiment thereof is shown in Figures 2 and 3, Figure 2 being a front view and Figure 3 a side view of the arrangement.

The apparatus there represented comprises a supporting structure 100 and a drive shaft 101 rotatably mounted therein. The family of code discs 69, 70 and 73 are fixed to the shaft for concurrent rotation thereby. A stationary sleeve 105 is mechanically connected to supporting structure 100 in coaxial relation with the drive shaft and a series of positioning discs 106, 107 and 108 are supported on the sleeve in frictional engagement therewith, and may be adjusted to selected angular positions thereon in a manner to be described. Scanning devices or pick-up heads 78, 79 and 86 are respectively supported by the positioning discs and extend into operating positions with respect to the corresponding code discs 69, 70 and 73. The specific type of scanning device employed is determined by the nature of the code discs. For example, the discs may have peripheral notches of a spacing and length representing a predetermined coding schedule in which case reluctance-type pick-up heads are used. Of course, the code discs may have other forms, for example, as previously mentioned they may be composed of magnetic material with the code information magnetically recorded about their peripheries with which inductance pick-up heads are employed. When the apparatus is connected into the circuit of Figure 1, scanning device 78 may be connected to amplifier 80, scanning device 79 connected to amplifier 81, and scanning device 86 to amplifier 85.

The positioning discs 106, 107 and 108 have peripheral teeth formed thereon so that the discs may be rotated about sleeve 105 by pinions 112, 113, 114 which mesh with the aforesaid teeth. The pinions, in turn, may be actuated by control knobs 115, 116 and 117, and the various angular settings of the several positioning discs are indicated by vernier dials 118, 119 and 120 affixed to the front of housing 100 as shown in Figure 2. It is evident that the position of any of the scanning devices with respect to the periphery and hence to the coding schedule of its associated code disc may be varied merely by adjustment of its associated control knob. Consequently, the several code schedules and the various signals developed by the scanning devices may have any of a wide range of phase relations, one with the other, as determined by these adjustments. It is contemplated that the phase relation of the schedules and the code selecting schedules used at the transmitter be varied from time to time, for example, at the end of each program interval to increase secrecy. To enable the receiver to utilize the television signal for any particular program the subscriber may call a distribution center and obtain the information concerning the relative phase of the code discs applicable to that program. Such information may be given in terms of the dial settings and once it has been obtained the subscriber merely adjusts dials 118, 119 and 120 in accordance therewith to establish an operating condition for the code storage device to develop decoding signals of the proper relative phase for the program in question. Subscription charges may be assessed against the various subscribers on the basis of each request for the dial-setting information.

For even greater secrecy, it is preferable that the calibration of dials 118, 119 and 120 be different for each subscriber so that the dial-setting information obtained by any one subscriber applies only to his or to a small number of widely separated devices. To further ensure that most of the subscribers of a large group will have different settings for any particular coding schedule, the coupling between the various adjusting knobs 115—117 and the positioning discs 106—108 is interchangeable and may be different for different groups of subscribers, as shown in Figure 3. More particularly, pinions 112, 113 and 114 are keyed to their shafts 121, 122 and 123 to be slidable therealong and actuating levers 124, 125 and 126 are provided for moving the pinions axially along their shafts. The actuating levers extend through apertures in the front panel of housing 100 and have notches or detents which may engage retaining springs (not shown) accommodated by such apertures. The notches of each actuating lever are spaced in accordance with the axial separation of discs 106—108 wherefore each pinion may be set to mesh with any one of the positioning discs. When this arrangement is used, each subscriber must receive the dial-setting information and must, in addition, be appraised of the appropriate settings for the actuating levers. Of course, still further secrecy is available by varying the connection of heads 78, 79 and 86 to units 80, 81 and 85, as between several decoding devices.

The invention provides, therefore, improved apparatus for supplying a plurality of individual control signals either to the coding device of a subscription television transmitter or to the decoding devices of the subscriber receivers operating in conjunction therewith, the apparatus being manually adjustable to any selected one of a multiplicity of settings to control the phase relation of the control signals and establish a desired coding schedule.

While a particular embodiment of the invention has been shown and described, modifications may be made, and it is intended in the appended claim to cover all such modifications as may fall within the true spirit and scope of the invention.

I claim:

Apparatus for supplying a plurality of individual control signals to an encoding device in a subscription television system comprising: a series of spaced, coaxially-aligned, code-record members individually having coding information recorded thereon representing a selected code pattern; driving means mechanically coupled to said record members for rotating said members at a selected speed; a corresponding series of spaced, positioning members co-axially aligned with said code record members and individually having peripheral teeth; a plurality of scanning devices respectively supported by said positioning members and extending into scanning relation with corresponding ones of said code-record members to derive said plurality of individual control signals; a series of pinions; a corresponding series of actuating arms respectively coupled to said pinions for selectively actuating said pinions into meshing engagement with said teeth of selected ones of said positioning members; and a manual setting mechanism for rotating said pinions to adjust the relative angular position of said positioning members and control the phase relation of said control signal.

References Cited in the file of this patent

UNITED STATES PATENTS 1,381,317 Loughridge ------------ June 14, 1921

2,403,059 Dillenback ------------ July 2, 1946

2,425,616 Hallborg et al. --------- Aug. 12, 1947

2,531,528 Potts ---------------- Nov. 28, 1950

2,573,349 Miller et al. ----------- Oct. 30, 1951

2,656,407 Herrick et al. ---------- Oct. 20, 1953

2,656,410 Herrick et al. ---------- Oct. 20, 1953